US012604280B2

(12) United States Patent
Yuan et al.

(10) Patent No.: US 12,604,280 B2
(45) Date of Patent: Apr. 14, 2026

(54) BEAM-SPECIFIC MPE REPORTING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 18/036,635

(22) PCT Filed: Jan. 14, 2021

(86) PCT No.: PCT/CN2021/071649
§ 371 (c)(1),
(2) Date: May 11, 2023

(87) PCT Pub. No.: WO2022/151121
PCT Pub. Date: Jul. 21, 2022

(65) Prior Publication Data
US 2023/0422185 A1 Dec. 28, 2023

(51) Int. Cl.
*H04W 52/36* (2009.01)

(52) U.S. Cl.
CPC ................................. *H04W 52/365* (2013.01)

(58) Field of Classification Search
CPC .......................... H04W 52/365; H04W 52/367
See application file for complete search history.

(56) References Cited

U.S. PATENT DOCUMENTS

| | | | |
|---|---|---|---|
| 11,115,939 B2 | 9/2021 | Cheng et al. | |
| 2020/0145079 A1* | 5/2020 | Marinier | H04W 72/23 |
| 2020/0186304 A1 | 6/2020 | Khoshnevisan et al. | |
| 2022/0006507 A1 | 1/2022 | Guan et al. | |
| 2022/0322247 A1* | 10/2022 | Sun | H04W 52/42 |

(Continued)

FOREIGN PATENT DOCUMENTS

| | | |
|---|---|---|
| WO | 2020192408 A1 | 10/2020 |
| WO | 2020227022 A2 | 11/2020 |

OTHER PUBLICATIONS

International Search Report and Written Opinion—PCT/CN2021/071649—ISA/EPO—Oct. 12, 2021.

(Continued)

*Primary Examiner* — Wen W Huang
(74) *Attorney, Agent, or Firm* — Procopio, Cory, Hargreaves & Savitch LLP

(57) ABSTRACT

The present disclosure relates to methods and devices for wireless communication of an apparatus, e.g., a UE and/or a base station. In one aspect, the apparatus may detect at least one MPE event for at least one of uplink beams, downlink beams, or UE panels. The apparatus may also configure, upon detecting the MPE event, a PHR including at least one of an MPE value, at least one beam ID, or at least one panel ID, the MPE value being associated with the MPE event, the at least one beam ID corresponding to the uplink beams or the downlink beams and the at least one panel ID corresponding to the UE panels. The apparatus may also transmit, to a base station, the PHR including at least one of the MPE value, the at least one beam ID, or the at least one panel ID.

28 Claims, 13 Drawing Sheets

500

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |

...

| P | V | PH (Type X, Serving Cell n) |
|---|---|---|
| MPE or R | | $P_{CMAX,f,c}$ m |

510

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |

...

| P | V | PH (Type X, Serving Cell n) |
|---|---|---|
| MPE or R | | $P_{CMAX,f,c}$ m |

(56) References Cited

U.S. PATENT DOCUMENTS

| | | | | |
|---|---|---|---|---|
| 2023/0403654 A1* | 12/2023 | Nielsen | ............... | H04W 52/367 |
| 2024/0015666 A1* | 1/2024 | Yuan | .................. | H04W 52/365 |
| 2024/0040520 A1* | 2/2024 | Matsumura | ......... | H04W 72/231 |

OTHER PUBLICATIONS

ZTE: "Enhancement on Multi-Beam Operation", 3GPP Draft, 3GPP TSG RAN WG1 Meeting #97, R1-1906237, Enhancement on Multi-Beam Operation, 3rd Generation Partnership Project (3GPP), Mobile Competence Centre, 650, Route Des Lucioles, F-06921, Sophia-Antipolis Cedex, France, vol. RAN WG1, No. Reno, USA, May 12, 2019-May 17, 20190517, May 4, 2019 (May 4, 2019), XP051708275, 18 Pages, Section 2.1, the Whole Document.

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.3.0 (Dec. 2020), Jan. 6, 2021, XP051999701, pp. 1-156, p. 113 p. 117.

Ericsson: "Discussion on MPE Enhancements", 3GPP TSG-RAN WG2 #111-e, Tdoc R2-2008093, 3rd Generation Partnership Project, Mobile Competence Centre, 650, Route Des Lucioles, F-06921 Sophia-Antipolis Cedex, France, vol. Ran WG2, No. Electronic meeting, Aug. 17, 2020-Aug. 28, 2020, 6 Pages, Aug. 7, 2020, XP051912710, The whole document.

Motorola Mobility, et al., "On Non-CA NR UL Power Control", 3GPPTSG RAN WG1 #91, R1-1720928, 3rd Generation Partnership Project, Mobile Competence Centre, 650, Route Des Lucioles, F-06921 Sophia-Antipolis Cedex, France, vol. RAN WG1, No. Reno, NV, USA, Nov. 27, 2017-Dec. 1, 2017, 12 Pages, Nov. 18, 2017, XP051370306, The whole document.

OPPO: "About MPE Enhancements", 3GPP TSG-RAN WG4 Meeting #92bis, R4-1910737, 3rd Generation Partnership Project, Mobile Competence Centre, 650, Route Des Lucioles, F-06921 Sophia-Antipolis Cedex, France, vol. RAN WG4, No. Chongqing, China, Oct. 14, 2019-Oct. 18, 2019, 3 Pages, Sep. 30, 2019, XP051783265, The whole document.

Supplementary European Search Report—EP21918332—Search Authority—The Hague—Sep. 9, 2024.

VIVO: "PHR Impacts for Beamforming", 3GPP TSG-RAN WG2 Meeting #100, R2-1713007, 3rd Generation Partnership Project, Mobile Competence Centre, 650, Route Des Lucioles, F-06921 Sophia-Antipolis Cedex, France, vol. Ran WG2, No. Reno, USA, Nov. 27, 2017-Dec. 1, 2017, 5 Pages, Nov. 17, 2017, XP051371840, The whole document.

3GPP: "3rd Generation Partnership Project; Technical Specification Group Radio Access Network; NR; Medium Access Control (MAC) protocol specification(Release 16)" 3GPP TS 38.321 V16.3.0 (Dec. 2020), pp. 1-156, Jan. 6, 2021, pp. 62-63, 124-129.

Intel Corporation: "Performance Considerations for RF Exposure Compliance in FR2", R4-1804127, 3GPP TSG-RAN WG4 Meeting #86-Bis, Melbourne, Australia, Apr. 16, 2018-Apr. 20, 2018, Apr. 7, 2018, pp. 1-4.

* cited by examiner

510

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |
| | | ... | | | | | |
| P | V | PH (Type X, Serving Cell n) | | | | | |
| MPE or R | | $P_{CMAX,f,c}$ m | | | | | |

| | | | | | | | |
|---|---|---|---|---|---|---|---|
| $C_7$ | $C_6$ | $C_5$ | $C_4$ | $C_3$ | $C_2$ | $C_1$ | R |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |
| P | V | PH (Type X, Serving Cell 1) | | | | | |
| MPE or R | | $P_{CMAX,f,c}$ 3 | | | | | |
| | | ... | | | | | |
| P | V | PH (Type X, Serving Cell n) | | | | | |
| MPE or R | | $P_{CMAX,f,c}$ m | | | | | |

| P | C1 or R | PH (Type 1, Pcell) |
|---|---|---|
| | MPE or R | Pcmax,ci |
| C2 or R | Panel ID or R | Beam ID |

| P | X=0 | PH (Type 1, Pcell) |
|---|---|---|
| | MPE or R | Pcmax,ci |
| C | Panel ID or R | Beam ID |

| P | X=1 | PH (Type 1, Pcell) |
|---|---|---|
| | MPE or R | Pcmax,ci |
| C | Panel ID or R | Beam ID |
| P | V or R | PH (Type 1, Pcell) |
| | MPE or R | Pcmax,ci |
| C | Panel ID or R | Beam ID |

| C7 | C6 | C5 | C4 | C3 | C2 | C1 | R |
|----|------|----|--------|----|----|----|---|
| X7 | X6=0 | X5 | X4=1 | X3 | X2 | X1 | R |

| P | V | PH (Type X, cell index) |
|-----|-----|-------------------------|
| | MPE1 or R | Pcmax |
| C or R | Panel ID | First Beam ID (beam with PHR) |
| C or R | Panel ID | Second Beam ID (candidate beam) |

| P | V | PH (Type X, cell index) |
|-----|-----|-------------------------|
| | MPE1 or R | Pcmax |
| C or R | Panel ID | First Beam ID (beam with PHR) |

| P | V | PH (Type X, cell index, O) |
|-----|-----|----------------------------|
| | MPE1 or R | Pcmax,o |
| C or R | Panel ID | First Beam ID (beam with PHR) |
| C or R | Panel ID | Second Beam ID (candidate beam, if MPE1 > threshold) |

| P | V | PH (Type X, cell index, O) |
|-----|-----|----------------------------|
| | MPE1 or R | Pcmax,o |
| C or R | Panel ID | First Beam ID (beam with PHR) |

FIG. 7B

| (P,V) | Real or Virtual PHR | Pc,max reported? | Add'l info reported? | Use case |
|---|---|---|---|---|
| (0,0) | Real | Pc,max | No | Real PHR without MPE |
| (1,0) | Real | Pc,max | No | Real PHR with MPE |
| (1,1) | Virtual | No | e.g., Beam+Panel ID | Virtual PHR with failed beam |
| (0,1) | Virtual | No | e.g., Beam+Panel ID | Virtual PHR with new beam |

FIG. 8A

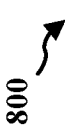
800

| P | V=1 | PH (Type X, cell index) |
|---|---|---|
| Additional information for beam or panel specific virtual PHR (panel ID/beam ID/MPE value/Pcmax) | | |

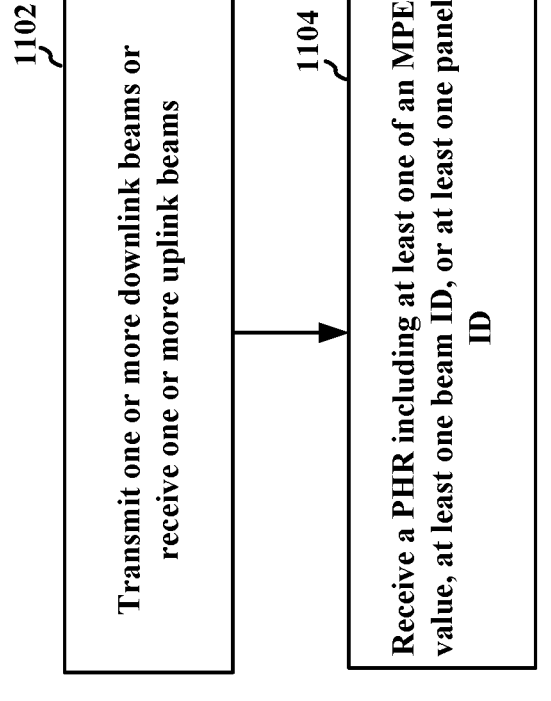
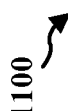
FIG. 11

BEAM-SPECIFIC MPE REPORTING

CROSS REFERENCE TO RELATED APPLICATION(S)

This application is a National Stage Application filed under 35 U.S.C. § 371 of PCT International Application No. PCT/CN2021/071649, entitled "METHODS AND APPARATUS FOR BEAM-SPECIFIC MPE REPORTING" and filed Jan. 14, 2021, which is expressly incorporated by reference herein in its entirety.

BACKGROUND

Technical Field

The present disclosure relates generally to communication systems, and more particularly, to MPE reporting in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). In some aspects, the apparatus may transmit, to a base station, one or more uplink beams or receive, from the base station, one or more downlink beams, where the at least one MPE event is detected for at least one of the one or more uplink beams or the one or more downlink beams. The apparatus may also detect at least one maximum permissible exposure (MPE) event for at least one of one or more uplink beams, one or more downlink beams, or one or more UE panels. Additionally, the apparatus may configure, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels. The apparatus may also transmit, to a base station, the PHR including at least one of the MPE value, the at least one beam ID, or the at least one panel ID.

In an aspect of the disclosure, a method, a computer-readable medium, and an apparatus are provided. The apparatus may be a base station. In some aspects, the apparatus may transmit, to a user equipment (UE), one or more downlink beams or receive, from the UE, one or more uplink beams. The apparatus may also receive, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating an example bitmap for wireless communication.

FIG. 5B is a diagram illustrating an example bitmap for wireless communication.

FIG. 6A is a diagram illustrating an example bitmap for wireless communication.

FIG. 6B is a diagram illustrating an example bitmap for wireless communication.

FIG. 6C is a diagram illustrating an example bitmap for wireless communication.

FIG. 7A is a diagram illustrating an example bitmap for wireless communication.

FIG. 7B is a diagram illustrating an example bitmap for wireless communication.

FIG. 8A is a diagram illustrating example information reporting for a real PHR or a virtual PHR.

FIG. 8B is a diagram illustrating an example bitmap for a virtual PHR.

FIG. 11 is a flowchart of a method of wireless communication.

DETAILED DESCRIPTION

Figure 1:
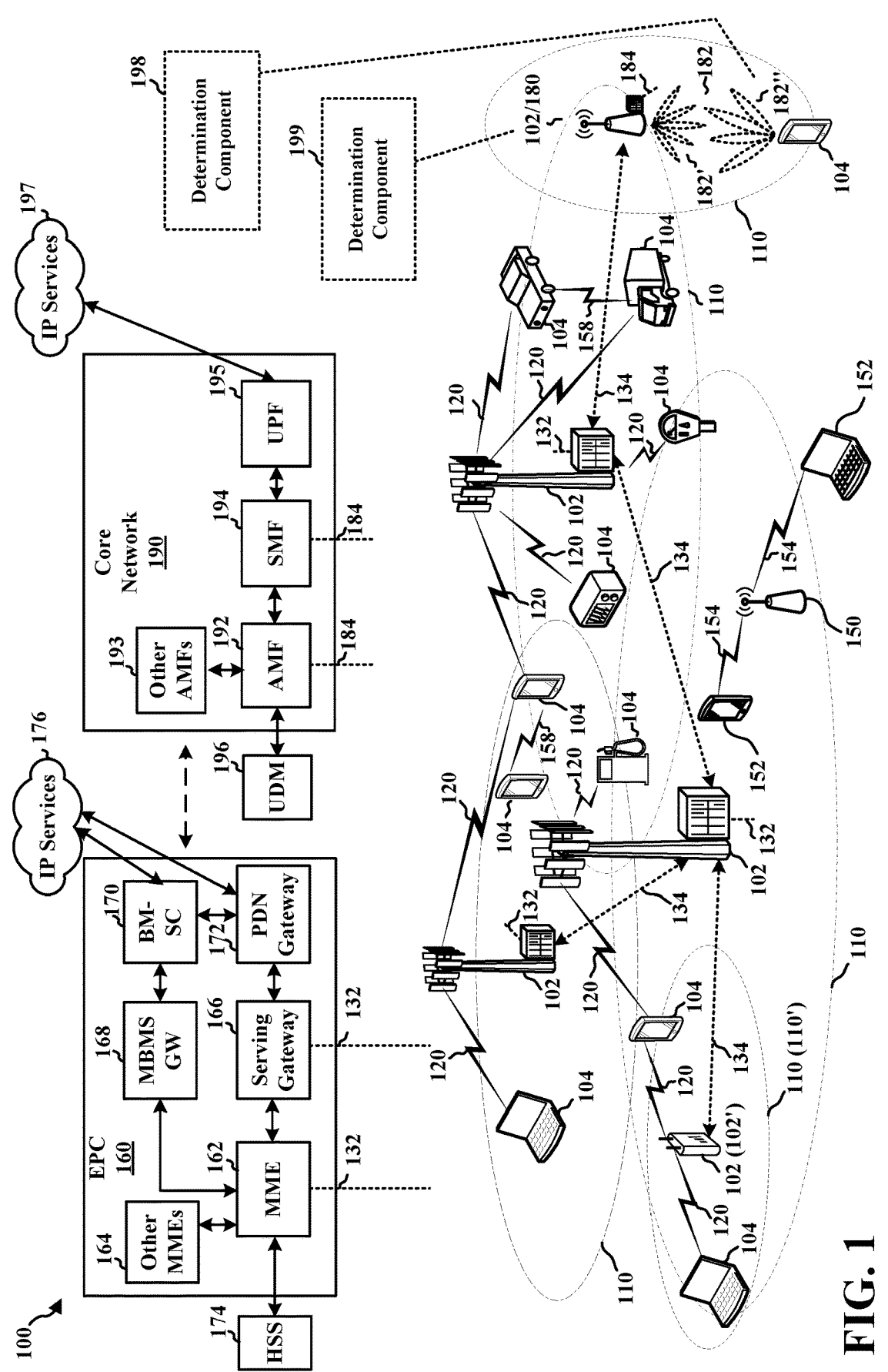
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to transmit, to a base station, one or more uplink beams or receive, from the base station, one or more downlink beams, where the at least one MPE event is detected for at least one of the one or more uplink beams or the one or more downlink beams. Determination component 198 may also be configured to detect at least one maximum permissible exposure (MPE) event for at least one of one or more uplink beams, one or more downlink beams, or one or more UE panels. Determination component 198 may also be configured to configure, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels. Determination component 198 may also be configured to transmit, to a base station, the PHR including at least one of the MPE value, the at least one beam ID, or the at least one panel ID.

Referring again to FIG. 1, in certain aspects, the base station 180 may include a determination component 199 configured to transmit, to a user equipment (UE), one or more downlink beams or receive, from the UE, one or more uplink beams. Determination component 199 may also be configured to receive, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels.

Although the following description may be focused on 5G NR, the concepts described herein may be applicable to other similar areas, such as LTE, LTE-A, CDMA, GSM, and other wireless technologies.

Figures 2A, 2B, 2C, 2D:
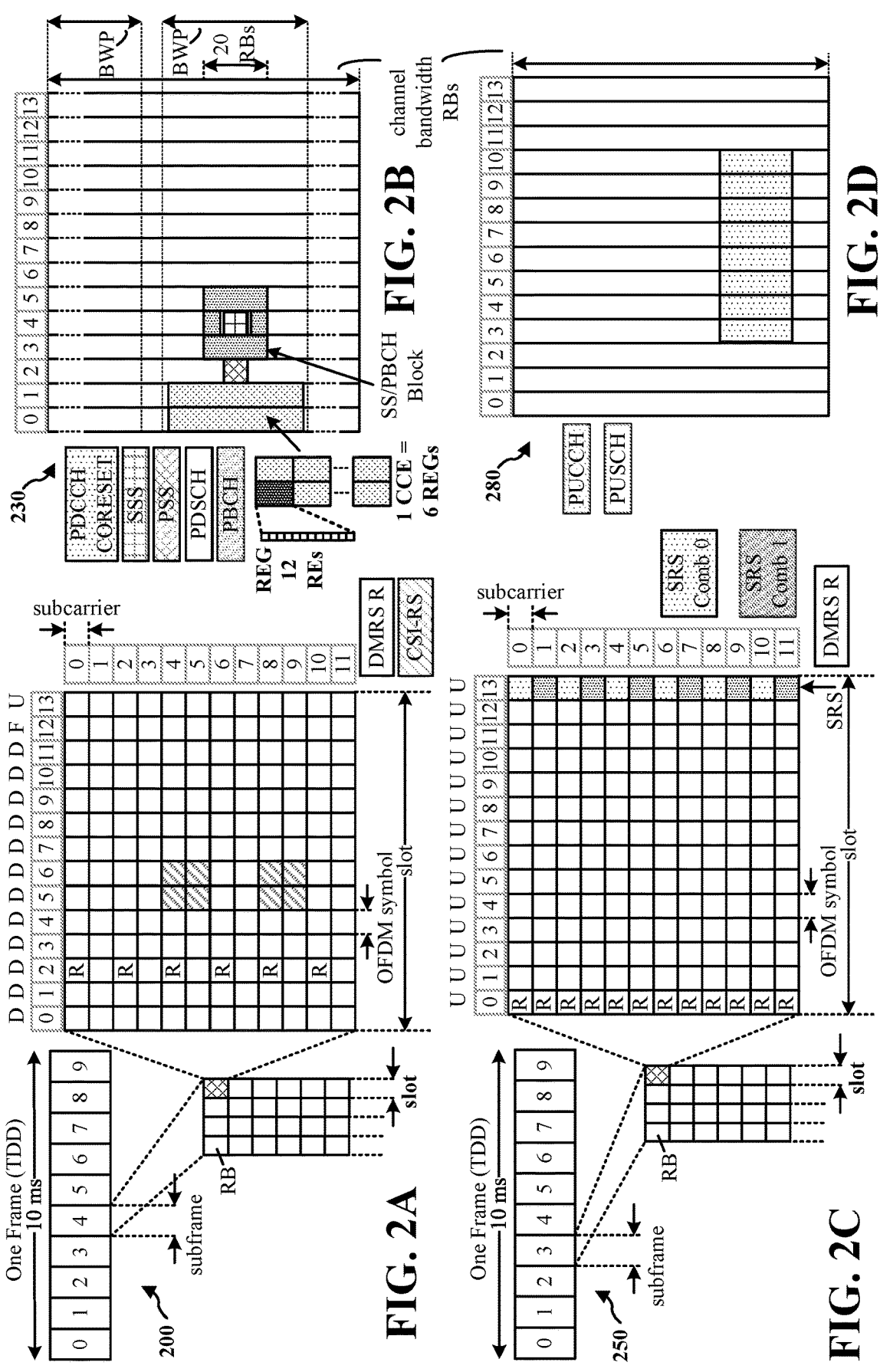
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
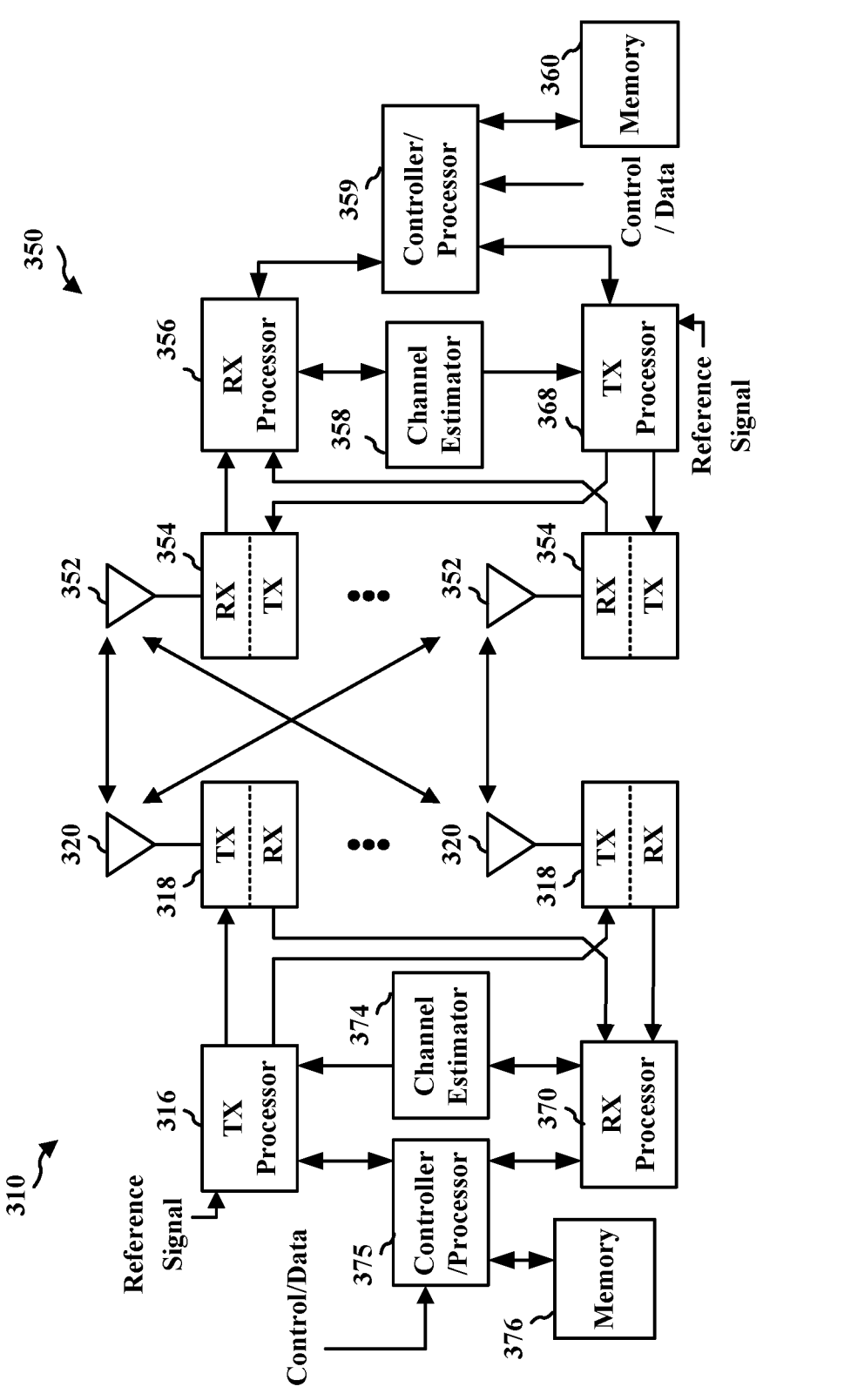
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication, maximum permissible exposure (MPE) is a regulation to limit the amount of maximum transmission power in the direct path of a human body. For instance, if a human body is in the direct path of a transmitted beam, this may trigger the detection of an MPE event. In some aspects, a UE may perform transmission (Tx) capping when detecting an MPE event. Based on the MPE event, depending on the distance between the transmitting device and the user or human body, the amount of Tx capping may be different. For example, if the distance between the human body and the transmitting device, e.g., a UE, is close, the Tx may be capped at one amount, e.g., 8 dBm. Also, if the distance between the human body and the transmitting device is farther, the Tx may be capped at a higher amount, e.g., 34 dBm.

For some detected MPE events, downlink transmissions may be acceptable, as the human body is far away from the transmitting device, e.g., a base station. However, for these same detected MPE events, uplink transmissions may not be acceptable, as the human body is closer to the transmitting device, e.g., a UE. As such, the uplink transmissions that correspond to MPE events may need an alternative uplink beam to ensure that the uplink transmissions are successfully transmitted.

Figures 4A, 4B, 4C:
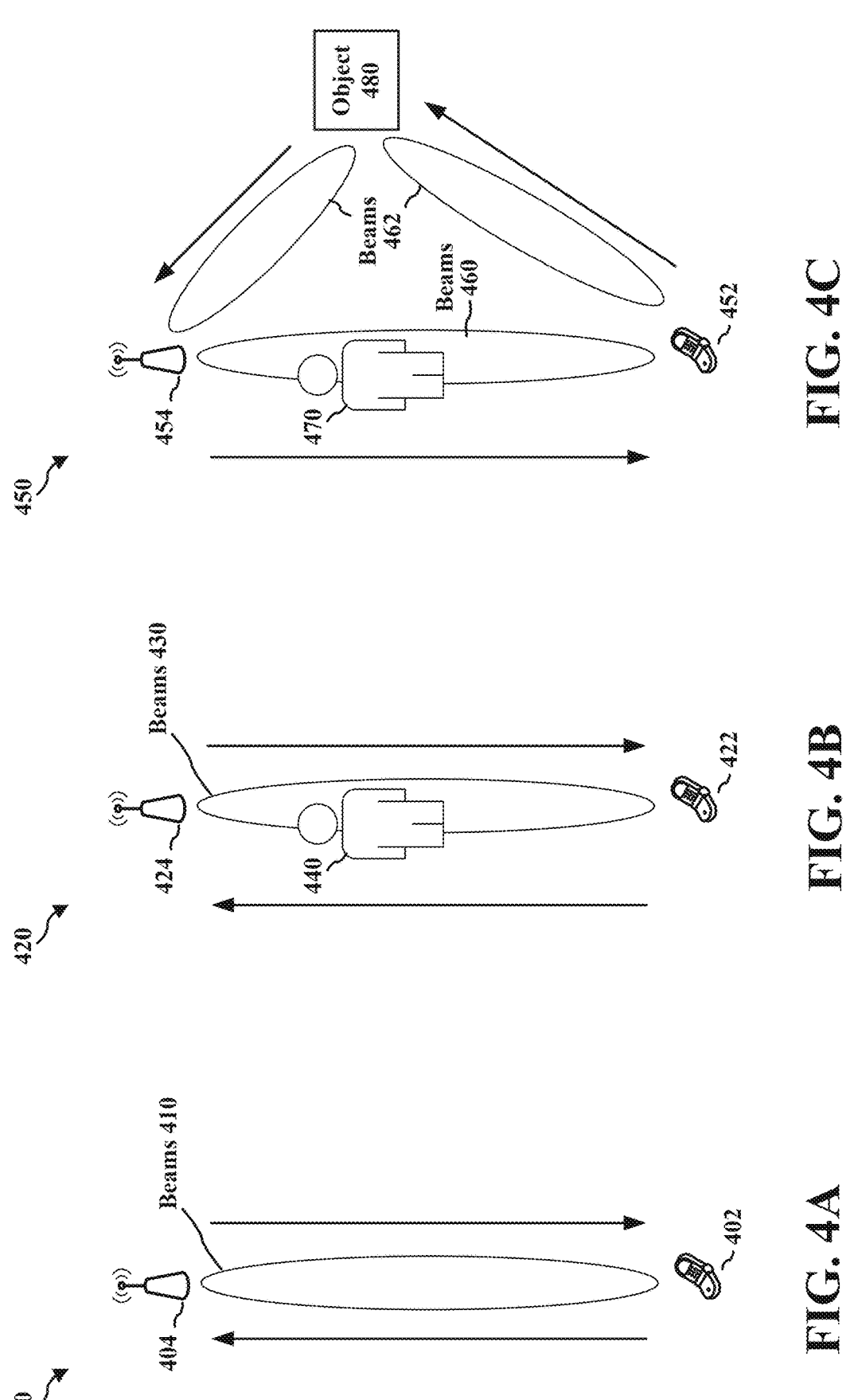
FIG. 4A is a diagram illustrating example communication between a UE and a base station.
FIG. 4B is a diagram illustrating example communication between a UE and a base station.
FIG. 4C is a diagram illustrating example communication between a UE and a base station.

FIGS. 4A, 4B, and 4C are diagrams 400, 420, and 450, respectively, illustrating example communication between a UE and a base station. As shown in FIG. 4A, diagram 400 includes UE 402 transmitting and/or receiving one or more beams, e.g., beams 410, with base station 404. In the scenario in FIG. 4A, both uplink (UL) and downlink (DL) transmissions may be acceptable, as there is no MPE event detected. As shown in FIG. 4B, diagram 420 includes UE 422 transmitting and/or receiving one or more beams, e.g., beams 430, with base station 424. In the scenario in FIG. 4B, based on the MPE event detected due to human body 440, downlink transmissions may be acceptable, but uplink transmissions may not be acceptable. As shown in FIG. 4C, diagram 450 includes UE 452 transmitting and/or receiving one or more beams, e.g., beams 460 and 462, with base station 454. In the scenario in FIG. 4C, based on the MPE event detected due to human body 470, downlink transmissions may be acceptable, but direct uplink transmissions may not be acceptable. Accordingly, the uplink transmissions may be altered to reflect off of object 480 in order to avoid human body 470.

Aspects of wireless communication may include a single panel power headroom report (PHR) that may be transmitted from a UE to a base station. Some aspects of wireless communication include single cell PHR reporting, which can include reporting MPE events. In single cell PHR reporting, 'R' may be a reserved bit and can be set to a certain value, e.g., a value of 0. The power headroom (PH) field 'PH' may indicate the power headroom level. If an MPE reporting parameter (e.g., mpe-Reporting) is configured, a 'P' bit may be set to a value of 0 if the power backoff is less than a threshold, e.g., P_MPR_0. The 'P' bit may be set to a value of 1 if the power backoff is greater than a threshold, e.g., P_MPR_0. If the 'P' bit is set to a value of 0, the MPE value may not be reported. If the 'P' bit is set to a value of 1, the MPE value may be reported.

The maximum transmit power ($P_{CMAX,f,c}$) field indicates the $P_{CMAX,f,c}$ used for the calculation of a preceding PH field. In some aspects, if the MPE reporting parameter (mpe-Reporting) is not configured, the 'P' bit may be set to a value of 1 if the corresponding $P_{CMAX,f,c}$ field has a different value if no power backoff is applied, e.g., due to power management. Additionally, if mpe-Reporting is configured and the 'P' field is set to 1, the MPE field may indicate the applied power backoff to meet MPE specifications. The MPE field may indicate an index of the corresponding measured values of power management maximum power reduction (P-MPR) levels in dB if mpe-Reporting is configured or if the P field is set to a value of 1, and otherwise R bits are present. In some aspects of wireless communication, in multi-cell PHR reporting, the 'Ci' field may be the serving cell index. Also, the 'V' field may indicate whether the PH value is based on a real transmission (e.g., V=0) or a reference format (e.g., V=1). For a virtual PHR based on a reference format, Pcmax may not be reported. Accordingly, if V is set to a value of 1, then Pcmax may not be reported.

FIGS. 5A and 5B are diagrams 500 and 510, respectively, illustrating an example bitmap for wireless communication. More specifically, FIGS. 5A and 5B illustrate bitmaps of multi-cell PHR reporting. As shown in FIGS. 5A and 5B, there are multiple bitmap entries, and each entry may include correspond to a single cell. Each bit in the bitmap represents a cell index, such that there is PHR reporting for the cell. FIG. 5A shows that diagram 500 includes eight (8) entries, where each entry corresponds to a serving cell. As shown in FIG. 5A, the $C_0$ bit corresponds to a reserved bit 'R'. FIG. 5B shows that diagram 510 includes 32 cells, where each entry corresponds to a serving cell.

In some aspects, when an MPE event happens, a base station may need additional beam information from a UE during the reporting of a beam specific MPE event. Based on the above, it may be beneficial to provide beam-specific MPE reporting, where the power backoff values (i.e., the MPE values) during the MPE event may be applied differently from beam-to-beam or from antenna panel-to-antenna panel. It may also be beneficial to include additional beam information in a PHR for an MPE event. Additionally, a virtual PHR may report a PHR value, but no other information may be reported. However, for a beam-specific MPE event, even in a virtual PHR report, a base station may need additional information related to beam-specific MPE event. Accordingly, it may be beneficial to include additional information related to a beam-specific MPE event in a virtual PHR report.

Aspects of the present disclosure may provide for beam-specific MPE reporting. Aspects of the present disclosure may also include additional beam information from a UE when reporting a beam-specific MPE event. For instance, aspects of the present disclosure may include additional beam information in a PHR for an MPE event. Aspects of the present disclosure may also include additional information related to a beam-specific MPE event in a virtual PHR report.

In some instances, when a UE is configured with a multi-panel operation, aspects of the present disclosure may enhance a single cell PHR report to indicate an additional beam ID and/or panel ID for a reported beam-specific MPE value. For example, a beam ID may be included in a new octet along with other information, e.g., a synchronization signal block (SSB) ID, a channel state information reference signal (CSI-RS) ID, a sounding reference signal (SRS) ID, an uplink spatial relation information ID, or a transmission configuration indication (TCI) state ID. Additionally, a panel ID can be optionally configured to be reported with a beam ID.

In some aspects, a panel ID or a beam ID can indicate the beam associated with the reported MPE event. The MPE value can be associated with a panel ID or a beam ID, such that the MPE value is specific to one of multiple panels at a UE or one of multiple beams. If the associated MPE value is acceptable, the panel ID or beam ID may correspond to a candidate panel or beam indication. Further, if the MPE value is small, the panel or beam may be available for uplink transmission. Otherwise, if the MPE value is large, the panel ID or beam ID may correspond to a failed panel or beam indication. So if the MPE value is relatively large, the panel and/or beam may not be available for uplink transmission.

As indicated above, the beam ID and/or the panel ID may be distinct, as they refer to a specific beam or a specific panel on the UE, so aspects of the present disclosure can report both the beam ID and the panel ID independently and distinctly. Also, a 'C' bit in the PHR can optionally be configured to be reported when the beam ID or panel ID is reported. For example, if C is set to a value of 1, the beam ID may be reported, otherwise beam ID may not be reported. Also, 'C' can be optionally reported as C1 in the same octet as the PH value or as C2 in another octet. For example, if C1 is set to a value of 1, the beam ID may be reported, or if C2 is set to a value of 1, the beam ID may be reported.

In some aspects, a certain level of a UE, e.g., the application level, can detect whether there is an MPE event. Once an MPE event is detected, this can be communicated to a lower level in order to transmit a PHR report. The UE can transmit the PHR report and provide updated information for downlink or uplink beams or UE panels based on the MPE event. When the UE indicates a beam ID or a UE panel ID, the base station may determine for which beam or panel the MPE event corresponds.

In some instances, the bitmap of the PHR can include a cell ID. If no additional cell ID is provided, this may refer to the primary cell ID. Also, there may be a specific cell ID if the cell is a serving cell. For instance, the 'C' bit in the bitmap may refer to a specific serving cell ID. In some aspects, a primary cell may utilize single cell PHR reporting that does not include any cell ID or cell identification. So if there is no specific serving cell ID, this may correspond to a single cell PHR report for the primary cell.

FIGS. 6A, 6B, and 6C are diagrams 600, 610, and 620, respectively, illustrating an example bitmap for wireless communication. More specifically, FIGS. 6A and 6B illustrate bitmaps for PHR reporting. FIG. 6A displays a single entry PHR, so a UE may report the PH for a single panel. As shown in FIG. 6A, the panel ID can be optionally configured to be reported with the beam ID. Alternatively, the panel ID can correspond to a reserved bit in the bitmap. As illustrated in FIG. 6A, the beam ID and the panel ID may be reported both independently and distinctly. Also, the 'C' bit in the PHR can optionally be configured to be reported when the beam ID or panel ID is reported. For example, if C is set to a value of 1, the beam ID may be reported, otherwise beam ID may not be reported. Also, 'C' can be optionally reported as C1 or C2. For example, if C1 is set to a value of 1, the beam ID may be reported, or if C2 is set to a value of 1, the beam ID may be reported. If C1 or C2 are set to a value of 0, then the beam ID may not be reported.

As shown in FIGS. 6B and 6C, diagrams 610 and 620 correspond to a multiple entry PHR, so the UE may report the PH for multiple panels or multiple beams of a cell. FIGS. 6B and 6C may be similar to a single cell PHR report with multiple panels or multiple beams. As shown in FIGS. 6B and 6C, when a UE is configured with a multi-panel operation, a single cell PHR report may be enhanced with a flexible number of entries indicating beam-specific PHR or MPE values and beam IDs. For example, as shown in FIG. 6B, when an X bit is set to a value of 0, this may indicate that one PHR/MPE for one beam/panel is reported. As shown in FIG. 6C, when an X bit is set to a value of 1, this may indicate that a second PHR/MPE for another beam/panel is also reported. As such, when an X bit is set to a value of 1, the UE can report two entries for the PHR report. The first entry of the PHR report may correspond to a first panel, and the second entry of the PHR report may correspond to a second panel, and the panel ID may indicate which panel is associated with the PHR report. So FIGS. 6B and 6C may correspond to a multiple entry PHR, where the UE may report the PH for multiple panels or multiple beams of a cell. Further, when a V bit is set to a value of 1, this may indicate that the second PHR is a virtual PHR based on the reported beam ID for the panel.

FIGS. 7A and 7B are diagrams 700 and 710, respectively, illustrating an example bitmap for wireless communication. More specifically, FIGS. 7A and 7B illustrate bitmaps for PHR reporting. As shown in FIG. 7A, diagram 700 is one example of a bitmap including multiple 'C' bits for multiple serving cells of a serving cell index. FIG. 7A illustrates that the PHR may include multiple bits in the bitmap for multiple beams for each serving cell identified in the PHR. As shown in FIG. 7A, when a UE is configured with a multi-panel operation, the PHR may be enhanced with an additional bit for each serving cell to indicate that one or more beams are reported with a PHR or MPE value. For example, for one of the serving cells in the bitmap, e.g., corresponding to the C4 bit in FIG. 7A, if the 'X' bit is set to 1, then two beams may be reported for a PHR/MPE value of the cell. The first beam in the bitmap may be utilized to calculate a MPE or PHR value for the serving cell. Also, the first beam may correspond to a first beam ID, which may be the currently utilized beam. So the MPE value and PH value may be associated with the first beam, as shown in FIG. 7A. The second beam in the bitmap may be utilized to provide a new beam which may serve as an alternative or feasible beam to the first beam with an MPE event. The second beam may correspond to a second beam ID.

In some instances, as shown in FIG. 7A, the second beam reported in the PHR may be an alternative beam for the first beam with MPE. So the second beam may be a candidate beam, and the information in the bitmap for the second beam may be candidate beam information. The second beam provides an alternative beam for the base station. Additionally, for a serving cell in the bitmap, e.g., corresponding to the C6 bit in FIG. 7A, if the 'X' bit is set to 0, one PHR/MPE/beam/panel may be reported for the serving cell. So the beam may be the beam applied for calculating the MPE value and the PH value. As shown in FIG. 7A, aspects of the present disclosure may add a bit in the bitmap in the PHR to report multiple beams for each cell, e.g., a utilized beam and an alternative beam.

As shown in FIG. 7B, when a UE is configured with multi-panel operation, a PHR report may be enhanced to indicate a candidate beam/panel based on the reported PHR/MPE value. For example, as shown in FIG. 7B, if an MPE value, e.g., MPE1, is greater than a threshold, two beams/panels may be reported for the corresponding PHR/MPE value. The first beam may be utilized to calculate an MPE value and a PHR value. The second beam may be utilized as an alternative beam for the first beam with an MPE value. As such, the second beam may be a candidate beam in the case of an MPE event. For instance, if the MPE value for the first beam is large, this means that the first beam may not be acceptable, so the PHR can include the second beam as an alternative beam. The first beam may correspond to a first beam ID, and the second beam may correspond to a second beam ID. Also, if the MPE value is less than a threshold, one beam/panel may be reported for the PHR/MPE value. For instance, the one beam may be utilized to calculate the MPE or PHR value. So if the MPE value is small, this may correspond to an acceptable beam and one beam may be reported, as an alternative beam is not necessary. In some aspects, the threshold may be preconfigured or fixed, and the UE may report the second beam information in the PHR if the first beam is reported with an MPE value larger than the threshold. Otherwise, the UE may not report the second beam information in the PHR.

As indicated above, aspects of the present disclosure may include additional information related to a beam-specific MPE event in a virtual PHR report. For example, when a UE is configured with a multi-panel operation, aspects of the present disclosure may enhance a virtual PHR report to indicate additional information e.g., a panel ID, a beam ID, an MPE value, and/or a Pcmax value. In some instances, a virtual PHR calculation may be based on the reported panel ID or beam ID. For example, if a 'P' bit is set to 0, additional information may be reported in the PHR for a candidate panel or beam. If a 'P' bit is set to 1, additional information may be reported for a failed panel or beam. As indicated above, the 'V' field may indicate whether the PH value is based on a real transmission or a reference format. In some instances, if V bit is set to 1, which corresponds to a virtual PHR, the PH value may be based on a reference format. In these instances, the Pcmax value may not be reported in the octet next to the PH value. If the V bit is set to 0, which corresponds to a real PHR, the PH value may be based on a real transmission.

FIG. 8A is a diagram 800 illustrating example information reporting for a real PHR or a virtual PHR. As shown in FIG. 8A, when a 'V' bit is set to 0, this may correspond to a real PHR. When a 'V' bit is set to 1, this may correspond to a virtual PHR. As such, additional information may be reported in the virtual PHR. For instance, when a 'V' bit is set to 1, a beam ID or a panel ID may be reported in the PHR. In some examples, the beam ID or panel ID may be reported in the octet next to the PH value if a 'V' bit is set to 1. Also, when the 'P' bit is set to 1, this reported beam ID or panel ID may correspond to a failed beam or panel with an MPE event (e.g., a large MPE value). Likewise, when the 'P' bit is set to 0, this may correspond to a new beam or panel without an MPE event (e.g., small MPE value or no MPE value).

FIG. 8B is a diagram 810 illustrating an example bitmap for a virtual PHR. As shown in FIG. 8B, for a virtual PHR, when a 'V' bit is set to 1, there may be additional information reported in the virtual PHR. For example, when a 'V' bit is set to 1, the PHR may report a beam ID, a panel ID, an MPE value, or a Pcmax value.

Figure 9:
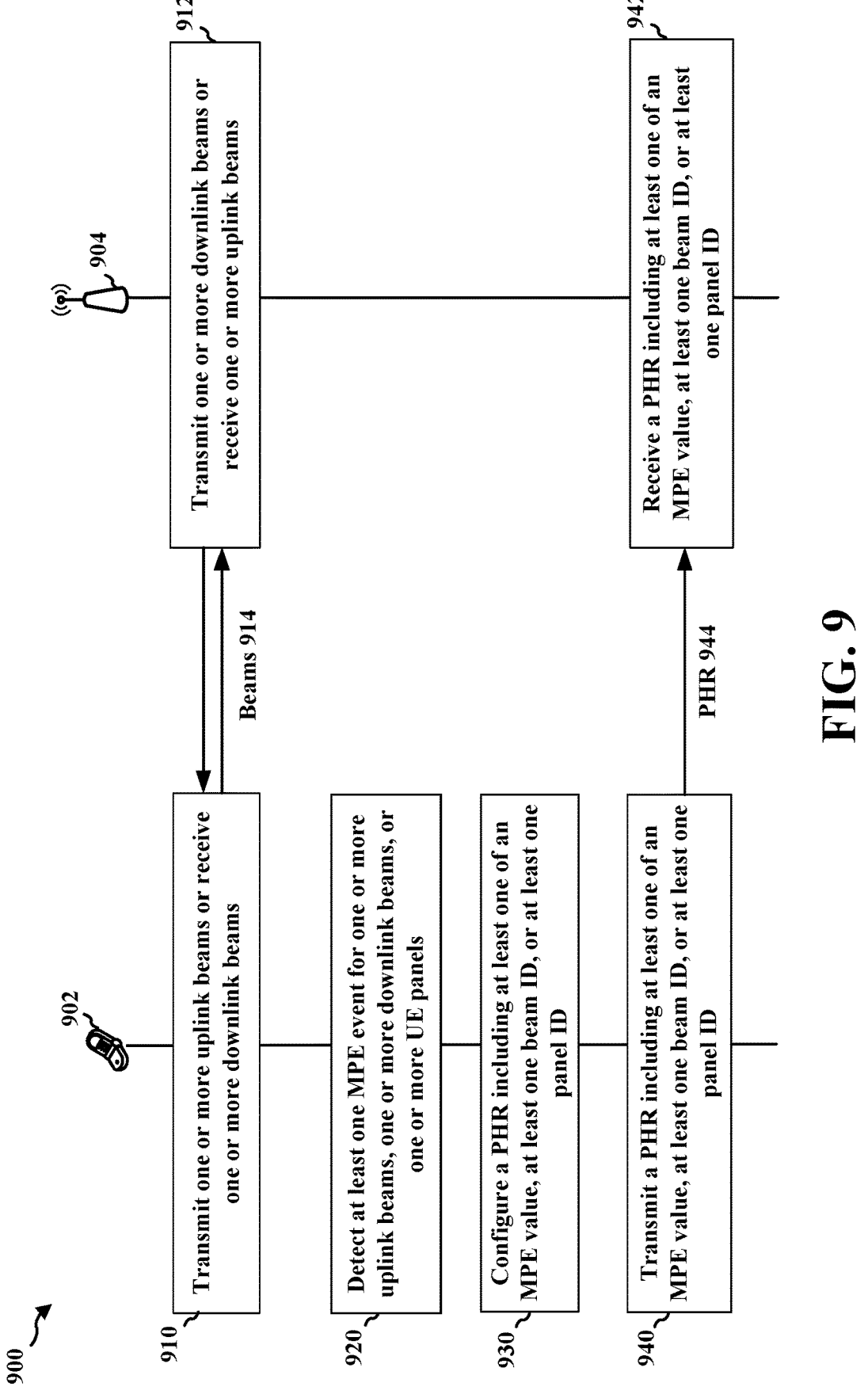
FIG. 9 is a diagram illustrating example communication between a UE and a base station.

FIG. 9 is a diagram 900 illustrating communication between a UE 902 and a base station 904. The UE 902 may correspond to UE 104, 350, 402/422/452, and apparatus 1202, and the base station 904 may correspond to base station 180, 310, 404/424/454, and apparatus 1302.

At 910, UE 902 may transmit, to base station 904, one or more uplink beams, e.g., beams 914, or receive, from the base station, one or more downlink beams, e.g., beams 914, where the at least one MPE event is detected for at least one of the one or more uplink beams or the one or more downlink beams. At 912, base station 904 may transmit, to UE 902, one or more downlink beams, e.g., beams 914, or receive, from the UE, one or more uplink beams, e.g., beams 914.

At 920, UE 902 may detect at least one maximum permissible exposure (MPE) event for at least one of one or more uplink beams, one or more downlink beams, or one or more UE panels.

At 930, UE 902 may configure, upon detecting the MPE event, a power headroom report (PHR), e.g., PHR 944, including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels.

In some aspects, the PHR, e.g., PHR 944, may be associated with a bitmap of a medium access control (MAC) control element (MAC-CE), the bitmap including a first bit for indicating the at least one beam ID and a second bit for indicating the at least one panel ID. The at least one beam ID may be indicated in the PHR, e.g., PHR 944, if the first bit is set to a value of 1, and the at least one panel ID may be indicated in the PHR if the second bit is set to a value of 1. In some instances, the at least one beam ID may correspond to two or more beam IDs and the at least one panel ID may correspond to two or more panel IDs. The two or more beam IDs or the two or more panel IDs may be indicated by a bit in a bitmap associated with the PHR, e.g., PHR 944, where the bit is set to a value of 1.

Additionally, the PHR, e.g., PHR 944, may be associated with a bitmap including an indication of one or more serving cells, the one or more serving cells corresponding to the at least one beam ID. The bitmap may include a bit for each of the one or more serving cells, where if the bit for each serving cell is set to 1, the at least one beam ID may correspond to two or more beam IDs, and where if the bit for each serving cell is set to 0, the at least one beam ID may correspond to one beam ID. If the MPE value for each of the one or more serving cells is greater than a threshold, the at least one beam ID may correspond to two or more beam IDs, and where if the MPE value for each of the one or more serving cells is less than the threshold, the at least one beam ID may correspond to one beam ID.

Moreover, the PHR, e.g., PHR 944, may include at least one of a real PHR value or a virtual PHR value. The real PHR value may correspond to a real beam transmission and the virtual PHR value may correspond to a reference format for a beam transmission. Also, the real PHR value and the virtual PHR value may be associated with the MPE value, the at least one beam ID, the at least one panel ID, or a maximum transmit power (Pcmax) value for at least one of the one or more uplink beams, the one or more downlink beams, or the one or more UE panels.

In some instances, if the MPE value is less than a threshold, the at least one beam ID or the at least one panel ID may correspond to a candidate beam. The at least one beam ID may correspond to a synchronization signal block (SSB) ID, a channel state information reference signal (CSI-RS) ID, a sounding reference signal (SRS) ID, an uplink spatial relation information ID, or a transmission configuration indication (TCI) state ID. Also, at least one of the at least one beam ID or the at least one panel ID may correspond to the MPE value associated with the MPE event. The PHR, e.g., PHR 944, may further include a maximum transmit power (Pcmax) value associated with at least one of the one or more uplink beams, the one or more downlink beams, or the one or more UE panels.

At 940, UE 902 may transmit, to base station 904, the PHR, e.g., PHR 944, including at least one of the MPE value, the at least one beam ID, or the at least one panel ID. At 942, base station 904 may receive, from UE 902, a PHR, e.g., PHR 944, including at least one of a MPE value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels.

Figure 10:
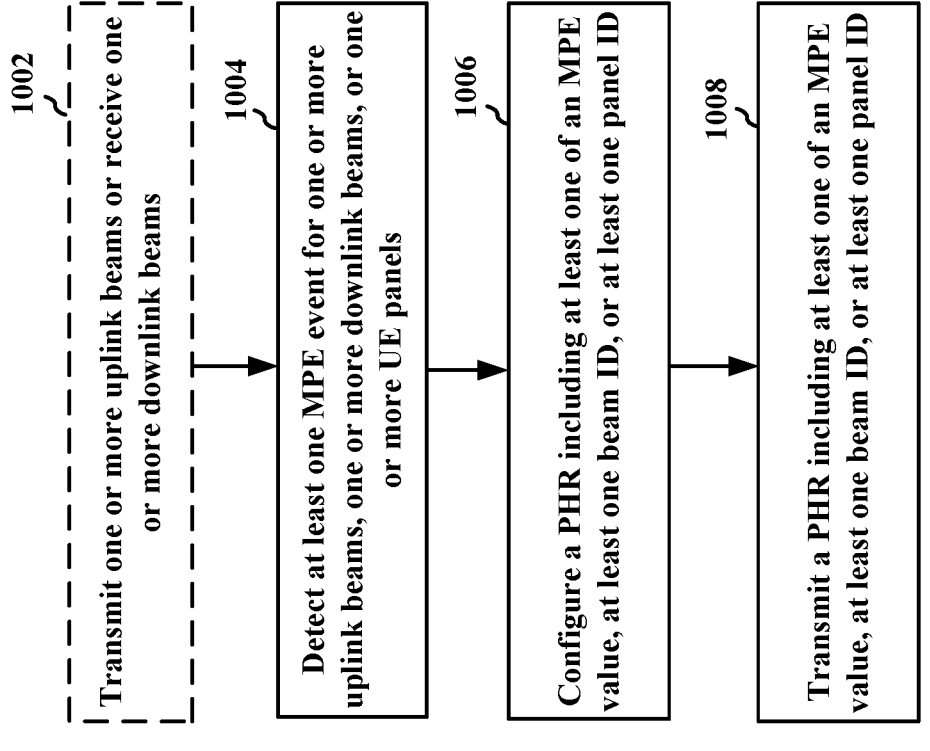
FIG. 10 is a flowchart of a method of wireless communication.

FIG. 10 is a flowchart 1000 of a method of wireless communication. The method may be performed by an apparatus, such as a UE or a component of a UE (e.g., the UE 104, 350, 402/422/452; apparatus 1202). Optional aspects are illustrated with a dashed line. The methods described herein can provide a number of benefits, such as improving communication signaling, resource utilization, and/or power savings.

At 1002, the apparatus may transmit, to a base station, one or more uplink beams or receiving, from the base station, the one or more downlink beams, where the at least one MPE event is detected for at least one of the one or more uplink beams or the one or more downlink beams, as described in connection with the examples in FIGS. 4A-9. For example, as described in 910 of FIG. 9, UE 902 may transmit, to base station 904, one or more uplink beams or receive, from base station 904, one or more downlink beams, where the at least one MPE event is detected for at least one of the one or more uplink beams or the one or more downlink beams. Further, 1002 may be performed by determination component 1240 in FIG. 12.

At 1004, the apparatus may detect at least one maximum permissible exposure (MPE) event for at least one of one or more uplink beams, one or more downlink beams, or one or more UE panels, as described in connection with the examples in FIGS. 4A-9. For example, as described in 920 of FIG. 9, UE 902 may detect at least one maximum permissible exposure (MPE) event for at least one of one or more uplink beams, one or more downlink beams, or one or more UE panels. Further, 1004 may be performed by determination component 1240 in FIG. 12.

At 1006, the apparatus may configure, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels, as described in connection with the examples in FIGS. 4A-9. For example, as described in 930 of FIG. 9, UE 902 may configure, upon detecting the MPE event, a PHR including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels. Further, 1006 may be performed by determination component 1240 in FIG. 12.

In some aspects, the PHR may be associated with a bitmap of a medium access control (MAC) control element (MAC-CE), the bitmap including a first bit for indicating the at least one beam ID and a second bit for indicating the at least one panel ID. The at least one beam ID may be indicated in the PHR if the first bit is set to a value of 1, and the at least one panel ID may be indicated in the PHR if the second bit is set to a value of 1. In some instances, the at least one beam ID may correspond to two or more beam IDs and the at least one panel ID may correspond to two or more panel IDs. The two or more beam IDs or the two or more panel IDs may be indicated by a bit in a bitmap associated with the PHR, where the bit is set to a value of 1.

Additionally, the PHR may be associated with a bitmap including an indication of one or more serving cells, the one or more serving cells corresponding to the at least one beam ID. The bitmap may include a bit for each of the one or more serving cells, where if the bit for each serving cell is set to 1, the at least one beam ID may correspond to two or more beam IDs, and where if the bit for each serving cell is set to 0, the at least one beam ID may correspond to one beam ID. If the MPE value for each of the one or more serving cells is greater than a threshold, the at least one beam ID may correspond to two or more beam IDs, and where if the MPE value for each of the one or more serving cells is less than the threshold, the at least one beam ID may correspond to one beam ID.

Moreover, the PHR may include at least one of a real PHR value or a virtual PHR value. The real PHR value may correspond to a real beam transmission and the virtual PHR value may correspond to a reference format for a beam transmission. Also, the real PHR value and the virtual PHR value may be associated with the MPE value, the at least one beam ID, the at least one panel ID, or a maximum transmit power (Pcmax) value for at least one of the one or more uplink beams, the one or more downlink beams, or the one or more UE panels.

In some instances, if the MPE value is less than a threshold, the at least one beam ID or the at least one panel ID may correspond to a candidate beam. The at least one beam ID may correspond to a synchronization signal block (SSB) ID, a channel state information reference signal (CSI-RS) ID, a sounding reference signal (SRS) ID, an uplink spatial relation information ID, or a transmission configuration indication (TCI) state ID. Also, at least one of the at least one beam ID or the at least one panel ID may correspond to the MPE value associated with the MPE event. The PHR may further include a maximum transmit power (Pcmax) value associated with at least one of the one or more uplink beams, the one or more downlink beams, or the one or more UE panels.

At 1008, the apparatus may transmit, to a base station, the PHR including at least one of the MPE value, the at least one beam ID, or the at least one panel ID, as described in connection with the examples in FIGS. 4A-9. For example, as described in 940 of FIG. 9, UE 902 may transmit, to a base station, the PHR including at least one of the MPE value, the at least one beam ID, or the at least one panel ID. Further, 1008 may be performed by determination component 1240 in FIG. 12.

FIG. 11 is a flowchart 1100 of a method of wireless communication. The method may be performed by an apparatus, such as base station or a component of a base station (e.g., the base station 180, 310, 404/424/454; apparatus 1302). Optional aspects are illustrated with a dashed line. The methods described herein can provide a number of benefits, such as improving communication signaling, resource utilization, and/or power savings.

At 1102, the apparatus may transmit, to a UE, one or more downlink beams or receive, from the UE, one or more uplink beams, as described in connection with the examples in FIGS. 4A-9. For example, as described in 912 of FIG. 9, base station 904 may transmit, to a UE, one or more downlink beams or receive, from the UE, one or more uplink beams. Further, 1102 may be performed by determination component 1340 in FIG. 13.

At 1104, the apparatus may receive, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels, as described in connection with the examples in FIGS. 4A-9. For example, as described in 942 of FIG. 9, base station 904 may receive, from the UE, a PHR including at least one of a MPE value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels. Further, 1104 may be performed by determination component 1340 in FIG. 13.

In some aspects, the PHR may be associated with a bitmap of a medium access control (MAC) control element (MAC-CE), the bitmap including a first bit for indicating the at least one beam ID and a second bit for indicating the at least one panel ID. The at least one beam ID may be indicated in the PHR if the first bit is set to a value of 1, and the at least one panel ID may be indicated in the PHR if the second bit is set to a value of 1. In some instances, the at least one beam ID may correspond to two or more beam IDs and the at least one panel ID may correspond to two or more panel IDs. The two or more beam IDs or the two or more panel IDs may be indicated by a bit in a bitmap associated with the PHR, where the bit is set to a value of 1.

Additionally, the PHR may be associated with a bitmap including an indication of one or more serving cells, the one or more serving cells corresponding to the at least one beam ID. The bitmap may include a bit for each of the one or more serving cells, where if the bit for each serving cell is set to 1, the at least one beam ID may correspond to two or more beam IDs, and where if the bit for each serving cell is set to 0, the at least one beam ID may correspond to one beam ID. If the MPE value for each of the one or more serving cells is greater than a threshold, the at least one beam ID may correspond to two or more beam IDs, and where if the MPE value for each of the one or more serving cells is less than the threshold, the at least one beam ID may correspond to one beam ID.

Moreover, the PHR may include at least one of a real PHR value or a virtual PHR value. The real PHR value may correspond to a real beam transmission and the virtual PHR value may correspond to a reference format for a beam transmission. Also, the real PHR value and the virtual PHR value may be associated with the MPE value, the at least one beam ID, the at least one panel ID, or a maximum transmit power (Pcmax) value for at least one of the one or more uplink beams, the one or more downlink beams, or the one or more UE panels.

In some instances, if the MPE value is less than a threshold, the at least one beam ID or the at least one panel ID may correspond to a candidate beam. The at least one beam ID may correspond to a synchronization signal block (SSB) ID, a channel state information reference signal (CSI-RS) ID, a sounding reference signal (SRS) ID, an uplink spatial relation information ID, or a transmission configuration indication (TCI) state ID. Also, at least one of the at least one beam ID or the at least one panel ID may correspond to the MPE value associated with the MPE event. The PHR may further include a maximum transmit power (Pcmax) value associated with at least one of the one or more uplink beams, the one or more downlink beams, or the one or more UE panels.

Figure 12:
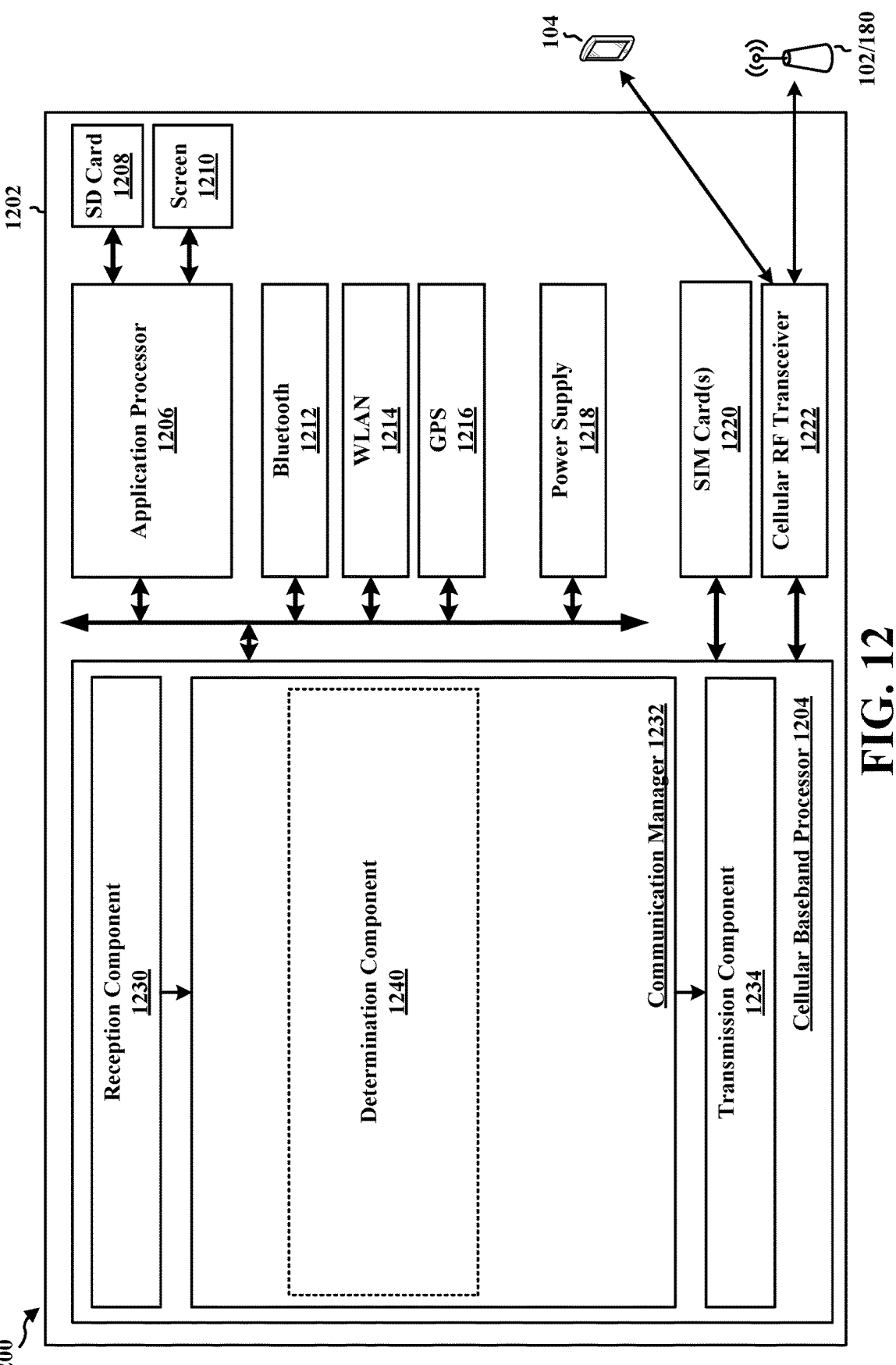
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that may be configured to transmit, to a base station, one or more uplink beams or receive, from the base station, one or more downlink beams, where at least one MPE event is detected for at least one of the one or more uplink beams or the one or more downlink beams, e.g., as described in connection with 1002 in FIG. 10. Determination component 1240 may also be configured to detect at least one maximum permissible exposure (MPE) event for at least one of one or more uplink beams, one or more downlink beams, or one or more UE panels, e.g., as described in connection with 1004 in FIG. 10. Determination component 1240 may also be configured to configure, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels, e.g., as described in connection with 1006 in FIG. 10. Determination component 1240 may also be configured to transmit, to a base station, the PHR including at least one of the MPE value, the at least one beam ID, or the at least one panel ID, e.g., as described in connection with 1008 in FIG. 10.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting, to a base station, one or more uplink beams or means for receiving, from the base station, one or more downlink beams, where at least one MPE event is detected for at least one of the one or more uplink beams or the one or more downlink beams; means for detecting at least one maximum permissible exposure (MPE) event for at least one of one or more uplink beams, one or more downlink beams, or one or more UE panels; means for configuring, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels; and means for transmitting, to a base station, the PHR including at least one of the MPE value, the at least one beam ID, or the at least one panel ID. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
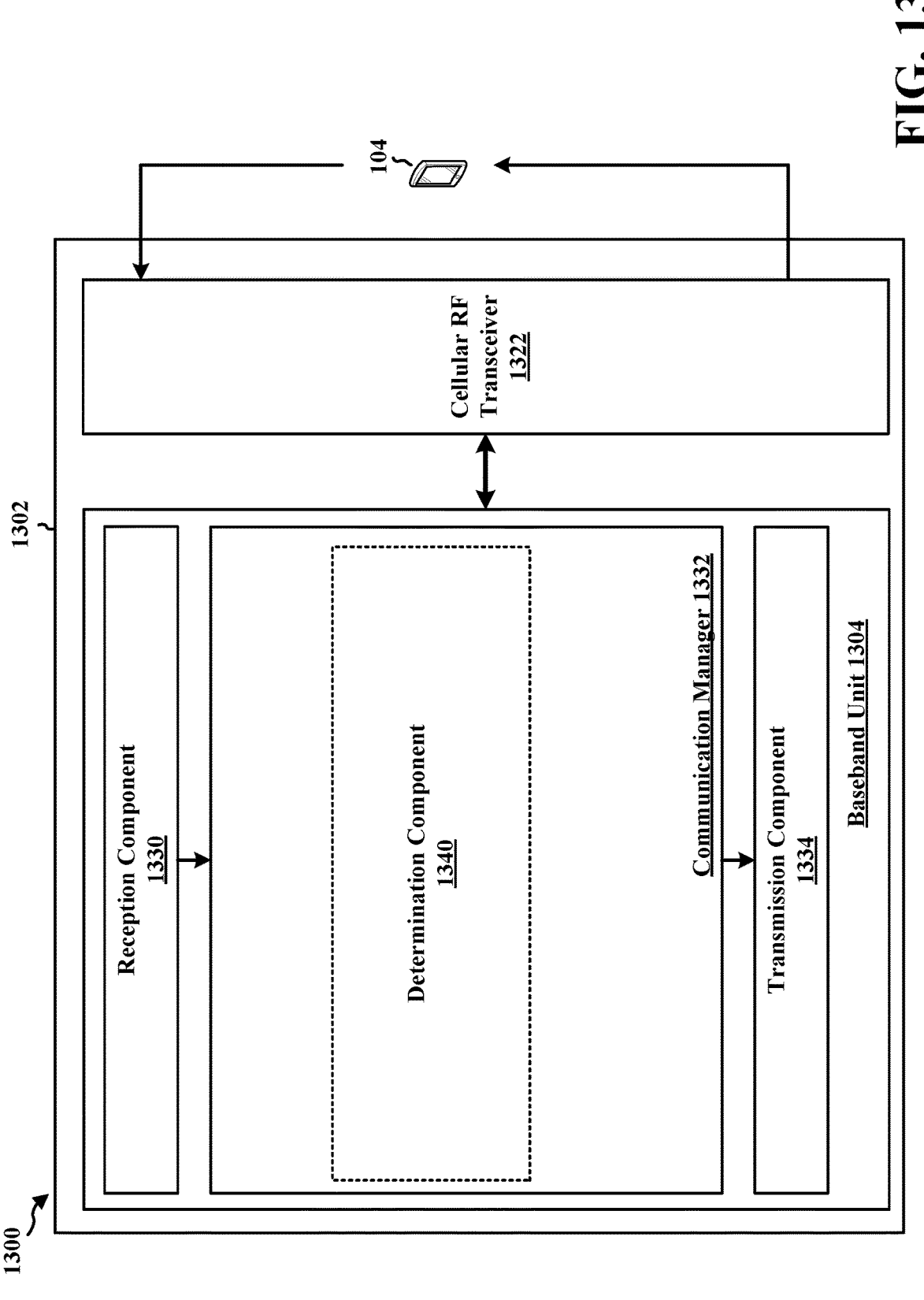
FIG. 13 is a diagram illustrating an example of a hardware implementation for an example apparatus.

FIG. 13 is a diagram 1300 illustrating an example of a hardware implementation for an apparatus 1302. The apparatus 1302 is a base station (BS) and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that may be configured to transmit, to a UE, one or more downlink beams or receive, from the UE, one or more uplink beams, e.g., as described in connection with 1102 in FIG. 11. Determination component 1340 may also be configured to receive, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels, e.g., as described in connection with 1104 in FIG. 11.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a user equipment (UE), one or more downlink beams or means for receiving, from the UE, one or more uplink beams; and means for receiving, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a user equipment (UE). The method includes detecting at least one maximum permissible exposure (MPE) event for at least one of one or more uplink beams, one or more downlink beams, or one or more UE panels; configuring, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels; and transmitting, to a base station, the PHR including at least one of the MPE value, the at least one beam ID, or the at least one panel ID.

Aspect 2 is the method of aspect 1, where the PHR is associated with a bitmap of a medium access control (MAC) control element (MAC-CE), the bitmap including a first bit for indicating the at least one beam ID and a second bit for indicating the at least one panel ID.

Aspect 3 is the method of any of aspects 1 and 2, where the at least one beam ID is indicated in the PHR if the first bit is set to a value of 1, and the at least one panel ID is indicated in the PHR if the second bit is set to a value of 1.

Aspect 4 is the method of any of aspects 1 to 3, where the at least one beam ID corresponds to two or more beam IDs and the at least one panel ID corresponds to two or more panel IDs.

Aspect 5 is the method of any of aspects 1 to 4, where the two or more beam IDs or the two or more panel IDs are indicated by a bit in a bitmap associated with the PHR, where the bit is set to a value of 1.

Aspect 6 is the method of any of aspects 1 to 5, where the PHR is associated with a bitmap including an indication of one or more serving cells, the one or more serving cells corresponding to the at least one beam ID.

Aspect 7 is the method of any of aspects 1 to 6, where the bitmap includes a bit for each of the one or more serving cells, where if the bit for each serving cell is set to 1, the at least one beam ID corresponds to two or more beam IDs, and where if the bit for each serving cell is set to 0, the at least one beam ID corresponds to one beam ID.

Aspect 8 is the method of any of aspects 1 to 7, where if the MPE value for each of the one or more serving cells is greater than a threshold, the at least one beam ID corresponds to two or more beam IDs, and where if the MPE value for each of the one or more serving cells is less than the threshold, the at least one beam ID corresponds to one beam ID.

Aspect 9 is the method of any of aspects 1 to 8, where the PHR includes at least one of a real PHR value or a virtual PHR value.

Aspect 10 is the method of any of aspects 1 to 9, where the real PHR value corresponds to a real beam transmission and the virtual PHR value corresponds to a reference format for a beam transmission.

Aspect 11 is the method of any of aspects 1 to 10, where the real PHR value and the virtual PHR value are associated with the MPE value, the at least one beam ID, the at least one panel ID, or a maximum transmit power (Pcmax) value for at least one of the one or more uplink beams, the one or more downlink beams, or the one or more UE panels.

Aspect 12 is the method of any of aspects 1 to 11, further including transmitting, to the base station, the one or more uplink beams or receiving, from the base station, the one or more downlink beams, where the at least one MPE event is detected for at least one of the one or more uplink beams or the one or more downlink beams.

Aspect 13 is the method of any of aspects 1 to 12, where if the MPE value is less than a threshold, the at least one beam ID or the at least one panel ID corresponds to a candidate beam.

Aspect 14 is the method of any of aspects 1 to 13, where the at least one beam ID corresponds to a synchronization signal block (SSB) ID, a channel state information reference signal (CSI-RS) ID, a sounding reference signal (SRS) ID, an uplink spatial relation information ID, or a transmission configuration indication (TCI) state ID.

Aspect 15 is the method of any of aspects 1 to 14, where at least one of the at least one beam ID or the at least one panel ID corresponds to the MPE value associated with the MPE event.

Aspect 16 is the method of any of aspects 1 to 15, where the PHR further includes a maximum transmit power (Pcmax) value associated with at least one of the one or more uplink beams, the one or more downlink beams, or the one or more UE panels.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

Aspect 20 is a method of wireless communication of a base station. The method includes transmitting, to a user equipment (UE), one or more downlink beams or receiving, from the UE, one or more uplink beams; and receiving, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels.

Aspect 21 is the method of aspect 20, where the PHR is associated with a bitmap of a medium access control (MAC) control element (MAC-CE), the bitmap including a first bit for indicating the at least one beam ID and a second bit for indicating the at least one panel ID.

Aspect 22 is the method of any of aspects 20 and 21, where the at least one beam ID is indicated in the PHR if the first bit is set to a value of 1, and the at least one panel ID is indicated in the PHR if the second bit is set to a value of 1.

Aspect 23 is the method of any of aspects 20 to 22, where the at least one beam ID corresponds to two or more beam IDs and the at least one panel ID corresponds to two or more panel IDs.

Aspect 24 is the method of any of aspects 20 to 23, where the two or more beam IDs or the two or more panel IDs are indicated by a bit in a bitmap associated with the PHR, where the bit is set to a value of 1.

Aspect 25 is the method of any of aspects 20 to 24, where the PHR is associated with a bitmap including an indication of one or more serving cells, the one or more serving cells corresponding to the at least one beam ID.

Aspect 26 is the method of any of aspects 20 to 25, where the bitmap includes a bit for each of the one or more serving cells, where if the bit for each serving cell is set to 1, the at least one beam ID corresponds to two or more beam IDs, and where if the bit for each serving cell is set to 0, the at least one beam ID corresponds to one beam ID.

Aspect 27 is the method of any of aspects 20 to 26, where if the MPE value for each of the one or more serving cells is greater than a threshold, the at least one beam ID corresponds to two or more beam IDs, and where if the MPE value for each of the one or more serving cells is less than the threshold, the at least one beam ID corresponds to one beam ID.

Aspect 28 is the method of any of aspects 20 to 27, where the PHR includes at least one of a real PHR value or a virtual PHR value.

Aspect 29 is the method of any of aspects 20 to 28, where the real PHR value corresponds to a real beam transmission and the virtual PHR value corresponds to a reference format for a beam transmission.

Aspect 30 is the method of any of aspects 20 to 29, where the real PHR value and the virtual PHR value are associated with the MPE value, the at least one beam ID, the at least one panel ID, or a maximum transmit power (Pcmax) value for at least one of the one or more uplink beams, the one or more downlink beams, or the one or more UE panels.

Aspect 31 is the method of any of aspects 20 to 30, where if the MPE value is less than a threshold, the at least one beam ID or the at least one panel ID corresponds to a candidate beam.

Aspect 32 is the method of any of aspects 20 to 31, where the at least one beam ID corresponds to a synchronization signal block (SSB) ID, a channel state information reference signal (CSI-RS) ID, a sounding reference signal (SRS) ID, an uplink spatial relation information ID, or a transmission configuration indication (TCI) state ID.

Aspect 33 is the method of any of aspects 20 to 32, where at least one of the at least one beam ID or the at least one panel ID corresponds to the MPE value associated with the MPE event.

Aspect 34 is the method of any of aspects 20 to 33, where the PHR further includes a maximum transmit power (Pcmax) value associated with at least one of the one or more uplink beams, the one or more downlink beams, or the one or more UE panels.

Aspect 35 is an apparatus for wireless communication including at least one processor coupled to a memory and configured to implement a method as in any of aspects 20 to 34.

Aspect 36 is an apparatus for wireless communication including means for implementing a method as in any of aspects 20 to 34.

Aspect 37 is a computer-readable medium storing computer executable code, where the code when executed by a processor causes the processor to implement a method as in any of aspects 20 to 34.

What is claimed is:

1. A method of wireless communication of a user equipment (UE), comprising:

detecting at least one maximum permissible exposure (MPE) event for at least one of one or more uplink beams, one or more downlink beams, or one or more UE panels;

configuring, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels; and transmitting, to a base station, the PHR including at least one of the MPE value, the at least one beam ID, or the at least one panel ID, wherein the PHR is associated with a bitmap of a medium access control (MAC) control element (MAC-CE), wherein the bitmap includes a first bit for indicating the at least one beam ID and a second bit for indicating the at least one panel ID.

2. The method of claim 1, wherein the at least one beam ID is indicated in the PHR if the first bit is set to a value of 1, and the at least one panel ID is indicated in the PHR if the second bit is set to a value of 1.

3. The method of claim 1, wherein the at least one beam ID corresponds to two or more beam IDs and the at least one panel ID corresponds to two or more panel IDs.

4. The method of claim 3, wherein the two or more beam IDs or the two or more panel IDs are indicated by a bit in a bitmap associated with the PHR, wherein the bit is set to a value of claim 1.

5. The method of claim 1, wherein the PHR is associated with a bitmap including an indication of one or more serving cells, the one or more serving cells corresponding to the at least one beam ID.

6. The method of claim 5, wherein the bitmap includes a bit for each of the one or more serving cells, wherein if the bit for each serving cell is set to 1, the at least one beam ID corresponds to two or more beam IDs, and wherein if the bit for each serving cell is set to 0, the at least one beam ID corresponds to one beam ID.

7. The method of claim 5, wherein if the MPE value for each of the one or more serving cells is greater than a threshold, the at least one beam ID corresponds to two or more beam IDs, and wherein if the MPE value for each of the one or more serving cells is less than the threshold, the at least one beam ID corresponds to one beam ID.

8. The method of claim 1, wherein the PHR includes at least one of a real PHR value or a virtual PHR value.

9. The method of claim 8, wherein the real PHR value corresponds to a real beam transmission and the virtual PHR value corresponds to a reference format for a beam transmission.

10. The method of claim 8, wherein the real PHR value and the virtual PHR value are associated with the MPE value, the at least one beam ID, the at least one panel ID, or a maximum transmit power (Pcmax) value for at least one of the one or more uplink beams, the one or more downlink beams, or the one or more UE panels.

11. The method of claim 1, further comprising:

transmitting, to the base station, the one or more uplink beams or receiving, from the base station, the one or more downlink beams, wherein the at least one MPE event is detected for at least one of the one or more uplink beams or the one or more downlink beams.

12. The method of claim 1, wherein if the MPE value is less than a threshold, the at least one beam ID or the at least one panel ID corresponds to a candidate beam.

13. The method of claim 1, wherein the at least one beam ID corresponds to a synchronization signal block (SSB) ID, a channel state information reference signal (CSI-RS) ID, a sounding reference signal (SRS) ID, an uplink spatial relation information ID, or a transmission configuration indication (TCI) state ID.

14. The method of claim 1, wherein at least one of the at least one beam ID or the at least one panel ID corresponds to the MPE value associated with the MPE event.

15. The method of claim 1, wherein the PHR further includes a maximum transmit power (Pcmax) value associated with at least one of the one or more uplink beams, the one or more downlink beams, or the one or more UE panels.

16. An apparatus for wireless communication of a user equipment (UE), comprising:
memory; and
at least one processor coupled to the memory and configured to:
detect at least one maximum permissible exposure (MPE) event for at least one of one or more uplink beams, one or more downlink beams, or one or more UE panels;
configure, upon detecting the MPE event, a power headroom report (PHR) including at least one of an MPE value, at least one beam identifier (ID), or at least one panel ID, the MPE value being associated with the MPE event, the at least one beam ID corresponding to the one or more uplink beams or the one or more downlink beams and the at least one panel ID corresponding to the one or more UE panels; and
transmit, to a base station, the PHR including at least one of the MPE value, the at least one beam ID, or the at least one panel ID, wherein the PHR is associated with a bitmap of a medium access control (MAC) control element (MAC-CE), wherein the bitmap includes a first bit for indicating the at least one beam ID and a second bit for indicating the at least one panel ID.

17. A method of wireless communication of a base station, comprising:
transmitting, to a user equipment (UE), one or more downlink beams or receiving, from the UE, one or more uplink beams; and
receiving, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels, wherein the PHR is associated with a bitmap of a medium access control (MAC) control element (MAC-CE), wherein the bitmap includes a first bit for indicating the at least one beam ID and a second bit for indicating the at least one panel ID.

18. The method of claim 17, wherein the at least one beam ID is indicated in the PHR if the first bit is set to a value of 1, and the at least one panel ID is indicated in the PHR if the second bit is set to a value of 1.

19. The method of claim 17, wherein the at least one beam ID corresponds to two or more beam IDs and the at least one panel ID corresponds to two or more panel IDs.

20. The method of claim 19, wherein the two or more beam IDs or the two or more panel IDs are indicated by a bit in a bitmap associated with the PHR, wherein the bit is set to a value of 1.

21. The method of claim 17, wherein the PHR is associated with a bitmap including an indication of one or more serving cells, the one or more serving cells corresponding to the at least one beam ID.

22. The method of claim 21, wherein the bitmap includes a bit for each of the one or more serving cells, wherein if the bit for each serving cell is set to 1, the at least one beam ID corresponds to two or more beam IDs, and wherein if the bit for each serving cell is set to 0, the at least one beam ID corresponds to one beam ID.

23. The method of claim 21, wherein if the MPE value for each of the one or more serving cells is greater than a threshold, the at least one beam ID corresponds to two or more beam IDs, and wherein if the MPE value for each of the one or more serving cells is less than the threshold, the at least one beam ID corresponds to one beam ID.

24. The method of claim 17, wherein the PHR includes at least one of a real PHR value or a virtual PHR value.

25. The method of claim 24, wherein the real PHR value corresponds to a real beam transmission and the virtual PHR value corresponds to a reference format for a beam transmission.

26. The method of claim 24, wherein the real PHR value and the virtual PHR value are associated with the MPE value, the at least one beam ID, the at least one panel ID, or a maximum transmit power (Pcmax) value for at least one of the one or more uplink beams, the one or more downlink beams, or the one or more UE panels.

27. The method of claim 17, wherein if the MPE value is less than a threshold, the at least one beam ID or the at least one panel ID corresponds to a candidate beam.

28. An apparatus for wireless communication of a base station, comprising:
memory; and
at least one processor coupled to the memory and configured to:
transmit, to a user equipment (UE), one or more downlink beams or receiving, from the UE, one or more uplink beams; and
receive, from the UE, a power headroom report (PHR) including at least one of a maximum permissible exposure (MPE) value, at least one beam identifier (ID), or at least one panel ID, the MPE value being associated with an MPE event, the at least one beam ID corresponding to the one or more uplink beams or the one or more downlink beams and the at least one panel ID corresponding to one or more UE panels, wherein the PHR is associated with a bitmap of a medium access control (MAC) control element (MAC-CE), wherein the bitmap includes a first bit for indicating the at least one beam ID and a second bit for indicating the at least one panel ID.

* * * * *